United States Patent
Gomyo et al.

(10) Patent No.: US 8,087,156 B2
(45) Date of Patent: *Jan. 3, 2012

(54) METHODS OF MANUFACTURING FLUID-DYNAMIC-PRESSURE BEARING AND SPINDLE MOTOR INCORPORATING THE BEARING, AND SPINDLE MOTOR AND RECORDING-DISK DRIVE INCORPORATING THE BEARING

(75) Inventors: Masato Gomyo, Kyoto (JP); Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/632,051

(22) Filed: Dec. 7, 2009

(65) Prior Publication Data
US 2010/0085662 A1    Apr. 8, 2010

Related U.S. Application Data

(62) Division of application No. 10/908,191, filed on May 2, 2005, now Pat. No. 7,650,697.

(30) Foreign Application Priority Data

Jun. 1, 2004  (JP) ................................. 2004-163446
Jun. 1, 2004  (JP) ................................. 2004-163901

(51) Int. Cl.
*B21D 53/10*  (2006.01)
*H02K 15/00*  (2006.01)
*H02K 21/12*  (2006.01)
*G11B 5/127*  (2006.01)

(52) U.S. Cl. .................... 29/603.03; 29/596; 29/898.02; 29/898.07; 310/156.21

(58) Field of Classification Search .................... 29/596, 29/603.03, 898.02, 898.07, 898.12; 310/67 R, 310/40 R, 156.21; 360/99.08, 97.01
See application file for complete search history.

(56) References Cited

U.S. PATENT DOCUMENTS

| | | | |
|---|---|---|---|
| 5,531,016 A | 7/1996 | Postma et al. | |
| 6,031,310 A * | 2/2000 | Ishikawa et al. | 310/156.21 |
| 6,188,155 B1 * | 2/2001 | Ishizuka et al. | 310/71 |
| 6,217,218 B1 | 4/2001 | Inoue et al. | |
| 6,271,612 B1 | 8/2001 | Tanaka et al. | |
| 6,375,357 B2 | 4/2002 | Miura et al. | |
| 6,817,766 B2 | 11/2004 | Gomyo | |

(Continued)

FOREIGN PATENT DOCUMENTS
JP    02-294423    12/1990
(Continued)

*Primary Examiner* — Alexander P Taousakis
(74) *Attorney, Agent, or Firm* — Keating & Bennett, LLP

(57) ABSTRACT

In spindle motors journaled on fluid-dynamic-pressure bearings, especially in such spindle motors employed in recording-disk drives in implementations that subject the drives to vibration and shock, sealing performance of a capillary seal formed between motor rotor-side and stator-side bearing surfaces, cohesiveness of oil-repellant on rotor-side/stator-side dry-area surfaces adjoining the capillary seal section, and motor inter-component adhesive strength are improved. The capillary-seal-constituting rotor-side/stator-side surface(s) are exposed to a plasma or to ultraviolet rays under predetermined conditions to improve the wettability of the surface(s) for the bearing fluid. The dry-area surface(s) are similarly irradiated so as to improve their wettability for the oil-repellant. Adhesively bonded component surfaces are likewise irradiated so as to improve their wettability for the adhesive, enhancing adhesive strength. Exposed surfaces may be constituted of a synthetic resin to enhance their wettability further, or may be made of metal, to yield a cleaning efficacy from the plasma/UV exposure.

2 Claims, 6 Drawing Sheets

U.S. PATENT DOCUMENTS

| | | |
|---|---|---|
| 6,914,358 B2 | 7/2005 | Tokunaga et al. |
| 7,317,271 B2 | 1/2008 | Obata et al. |
| 2001/0006565 A1 | 7/2001 | Gomyo et al. |
| 2003/0133634 A1 | 7/2003 | Le et al. |
| 2003/0186083 A1 | 10/2003 | Katayama |

FOREIGN PATENT DOCUMENTS

| | | |
|---|---|---|
| JP | 08-140304 | 5/1996 |
| JP | 2926240 | 5/1999 |
| JP | 2002-263563 A | 9/2002 |
| JP | 2002-323037 | 11/2002 |
| JP | 2003-065336 A | 3/2003 |
| JP | 2003-161322 | 6/2003 |
| JP | 2003-194060 A | 7/2003 |
| JP | 2003-214426 | 7/2003 |
| JP | 2005-282770 A | 10/2005 |

\* cited by examiner

METHODS OF MANUFACTURING FLUID-DYNAMIC-PRESSURE BEARING AND SPINDLE MOTOR INCORPORATING THE BEARING, AND SPINDLE MOTOR AND RECORDING-DISK DRIVE INCORPORATING THE BEARING

CROSS-REFERENCE TO RELATED APPLICATION

This is a Divisional of U.S. non-provisional patent application Ser. No. 10/908,191, filed on May 2, 2005 and issued as U.S. Pat. No. 7,650,697 on Jan. 26, 2010, which is incorporated herein by reference in its entirety.

BACKGROUND OF THE INVENTION

1. Technical Field

The present invention relates to fluid-dynamic-pressure bearing manufacturing methods, to spindle motor manufacturing methods, and to spindle motors and recording-disk drives.

2. Description of the Related Art

In recent years, the amount of information that is recorded per unit area on discoid recording media in hard-disk and like recording-disk drives has been increasing, and the information density has been on the rise. The increasing recording density has led to calls for stably supporting the discoid recording media under high-speed rotation.

Recording-disk drives, meanwhile, are finding applications other than in stationary computers, such as desk-top and server machines, in which the drives have been traditionally employed, and are being used in vehicular devices, portable devices, and other mobile devices. Such mobile applications have led to rising demands for impact resistance and longevity-demands without precedent in implementations in which the drives are employed under environments, as has conventionally been the case, that do not subject the drives to vibration and shock.

Against this backdrop, the development of bearings for stably supporting disk-drive rotor units under high-speed rotation has been ongoing.

In order that the bearings meet this demand, considerations of paramount importance are:

(A) Improvement in the sealing performance of the bearing's capillary seal section;

(B) Improvement in the ability to prevent wetting diffusion along the surfaces in the vicinity of the capillary seal; and (C) Improvement in the joint strength of the components that constitute the dynamic-pressure bearing and the spindle motor.

Consideration (A)

Fluid-dynamic-pressure bearings are composed of a journal unit and a journal-support unit, between which is formed a narrowed micro-gap. A lubricating fluid such as oil is retained within the gap. An oil sealing mechanism referred to as a capillary seal section is provided in the part of the bearing in which the micro-gap is open to the external atmosphere. The capillary seal section is of a form in which the gap between the journal and, opposing the journal, seal surfaces on the bearing's journal-support side gradually flares going axially upward. A boundary surface between the oil and the external atmosphere forms in the capillary seal section.

If the lubricating fluid is not sealed in by the capillary seal section, the fluid ends up leaking out to the exterior. As a consequence, the lubricating fluid retained in the micro-gap runs short, ultimately curtailing the lifespan of the bearing. In bearing implementations in miniature spindle motors in particular, since the gross amount of oil retained inside the bearing is very little, if even a slight amount of the lubricating fluid manages to leak out, an oil shortfall is liable to occur. Furthermore, the problem of weak sealing performance in capillary seals can allow shock or other impact on the bearing to disturb the integrity of the seal boundary surface.

Keeping the angle of contact between the oil and the components that constitute the capillary seal section small is crucial to enhancing the strength of capillary seals.

Consideration (B)

Oil repellant is applied to the surfaces of the components that constitute the outer side of the capillary seal section. Applying oil repellant prevents lubricating fluid from the capillary seal section from migrating along the bearing component surfaces to the bearing exterior by wetting-diffusion.

The way oil repellants are applied is to spread repellant that has been dissolved in a solvent onto the component surfaces, and vaporize the solvent to get the oil repellant to adhere to the surfaces.

Nevertheless, the wettability of the oil repellant for the seal component surfaces is poor, which has meant that the repellant-to-surface adhesiveness has not been satisfactory. Consequently, oil mop-up or associated concluding operations in manufacturing dynamic-pressure bearings cause the oil repellant to peel off easily. Although processes such as striating the components or spreading the oil repellant on thickly have been implemented to date on account of the behavior of the repellant, such processes elevate the component cost, and, moreover, have not amounted to a fundamental solution.

Consideration (C)

Spindle motors for hard-disk drives are furnished with a base component and, anchored to the base component, a cylindrical sleeve housing that serves as a stator-side bearing component. The outer circumferential surface of the sleeve housing is, by an interposed adhesive, fixed to the inner circumferential surface of a mounting hole formed in the base component.

The slightest warpage or deformation in spindle-motor bearing components becomes a problem particularly in fluid-dynamic-pressure bearings, in that the bearing gaps are extraordinarily narrow. On that account, in the plurality of inter-component junctions, adhesive anchoring by means of an adhesive agent is often employed instead of welding, in which thermal deformation is liable to occur.

Especially under environments, such as in mobile and vehicular devices, that place vibration and shock on the bearings, particularly large loads are placed on the joints between components. More particularly, the ability to withstand serious shock—in excess of 1000 Gs—can be mandatory in situations in which there is a likelihood of the devices being dropped. Consequent on the scaling down of spindle motors, however, is an abridgement of the inter-component binding length, which has made improving the binding strength a challenge.

BRIEF SUMMARY OF THE INVENTION

A first object of the present invention is to make available a manufacturing method that enables the adhesive strength in spindle motors to be improved.

A second object of the present invention is to afford a method of manufacturing fluid-dynamic-pressure bearings that enables the sealing performance of the capillary seal section to be improved.

A third object of the present invention is to make available a method of manufacturing fluid-dynamic-pressure bearings that enables oil repellant for oil-repelling surfaces to be cohered stably to the oil-repelling surfaces.

A fluid-dynamic-pressure bearing to which a fluid-dynamic-pressure bearing manufacturing method that is a first aspect of the present invention is applicable has the following configuration. Namely, the fluid-dynamic-pressure bearing comprises a stator unit and a rotor unit that is rotary with respect to the stator unit. The stator unit and the rotor unit oppose each other across a micro-gap. A lubricating fluid fills and is retained within the micro-gap.

A clearance that communicates with the micro-gap is formed in between the stator unit and the rotor unit. The portion of the clearance that communicates with the micro-gap serves as the capillary seal section. A boundary surface between the lubricating fluid and the external atmosphere forms in the capillary seal section. Surfaces of the stator unit and rotor unit oppose to form the capillary seal section.

The first aspect of the present invention, being a fluid-dynamic-pressure bearing manufacturing method as just set forth, includes at least the following first and second steps. In the first step, a surface-treating process consisting of at least one between plasma irradiation and ultraviolet-beam irradiation is implemented on at least one between a rotor-side surface and a stator-side surface that constitute the capillary seal section. In addition, after (which need not be directly after) the first step has been effected, the second step, in which lubricating fluid is infused into the micro-gap, is effected.

The first step in the first aspect of the invention may be effected before the rotor unit and the stator unit of the fluid dynamic-pressure bearing are assembled. In particular, the respective parts of the rotor unit and the stator unit may individually undergo the surface-treating process of the first step. Likewise, the surface-treating process of the first step may be effected on both the stator unit and the rotor unit, which may be on the rotor unit and stator unit simultaneously, or not at the same time.

Bearing manufacturing procedures including assembling, heating, pressurizing, and cleaning may be effected in between the first step and the second step.

Embodying the first aspect of the invention improves the wettability, with respect to organic substances, of the surfaces that constitute the capillary seal section, rendering the wetting angle extremely small. The improved wettability consequently improves the sealing performance of the capillary seal. An added advantage is that ultraviolet-beam and plasma irradiation of the capillary seal section surfaces(s) decompose and clean off metal-surface clinging organic matter, which is given to deteriorating the quality of the lubricating fluid. A still further benefit is that ultraviolet-beam and plasma irradiation do not require the use of chemicals that are hazardous to the environment. What is more, compared with processing surfaces using chemicals or by machining the relevant parts, the work in carrying out ultraviolet-beam and plasma irradiation is simple and the operation time is short. Operability and productivity therefore improve.

Furthermore, the second-step process of charging the bearing gap with lubricating fluid is the more advantageously effected through the capillary seal section. Charging the bearing via the surface(s) whose wettability has been improved by undergoing ultraviolet-beam or plasma irradiation keeps the lubricating fluid from incorporating air bubbles. The lubricating fluid infusion volume can therefore be adjusted more accurately.

Further to the first aspect of the present invention, advantageously at least one among the stator-unit and rotor-unit surfaces that constitute the capillary seal section is formed of a resin material. Resins are activated superficially by plasma irradiation or ultraviolet-beam irradiation, and thus constituting the seal-section surface(s) from a resin material improves the wettability of the surface(s) for lubricating fluid.

Still further to the first aspect of the invention, at least one among the stator-unit and rotor-unit surfaces that constitute the capillary seal section may be formed of metal. In the manufacturing method in that case, advantageously the surface-treating process, by means of at least one between plasma irradiation and ultraviolet-beam irradiation, in the first step is carried out over a broader extent on the metal components. Plasma-based cleaning or cleaning using ultraviolet beams dissolves grease and other grime clinging to the metal surfaces, and therefore are ideally suited to the cleaning of bearing components, in which a high level of cleanliness is mandatory. Effecting cleaning by means of the first step enables the cleaning process and the surface-treating process to be carried out at the same time, which makes for excellent operability of the manufacturing method.

Yet further to the first aspect of the present invention, at least one surface-treating process among the group of surface-treating processes consisting of plasma irradiation and ultraviolet-beam irradiation is implemented on at least any one surface among the stator-unit and rotor-unit surfaces that constitute the micro-gap.

The surfaces of the micro-gap constitute the bearing faces of the fluid dynamic-pressure bearing. Improving the wettability of the surfaces for the lubricating fluid enhances the bearing's ability to retain lubricating fluid between the stator-unit surfaces and the rotor-unit surfaces. The heightened inter-surface lubricant retaining ability contributes to preventing the stator-unit surfaces and rotor-unit surfaces from contacting, even as the bearing withstands stronger shocks and vibrations.

A fluid-dynamic-pressure bearing to which a fluid-dynamic-pressure bearing manufacturing method that is a second aspect of the present invention is applicable has the following configuration. Namely, the fluid-dynamic-pressure bearing, in a like manner as the fluid-dynamic-pressure bearing in the first aspect of the invention, comprises a stator unit and a rotor unit that is rotary with respect to the stator unit. Further, a capillary seal section is formed in the same manner as in the first aspect of the invention. A boundary surface between the lubricating fluid and the external atmosphere forms in the capillary seal section.

In addition, a dry-area face adjoining the capillary seal section is provided on at least one of either of the stator unit or rotor unit. The dry-area face is formed in order for the surface to be coated with oil repellant.

The second aspect of the present invention, being a fluid-dynamic-pressure bearing manufacturing method as just set forth, includes the following first, second and third steps. In the first step, a surface-treating process consisting of at least one between plasma irradiation and ultraviolet-beam irradiation is implemented on the dry-area face on at least one of either of the stator side or rotor side of the bearing. Furthermore, after (which need not be directly after) the first step, the second step, in which oil repellant is applied to the dry-area face(s), is effected. In addition, after (which need not be directly after) the second step, the third step, in which the inside of the micro-gap is charged with lubricating fluid, is effected.

As is the case with the first step in the first aspect of the present invention, it does not matter whether the first step in the second aspect of the invention precedes or follows the bearing assembly process. Furthermore, in implementations in which the first step is effected on both the stator unit and the rotor unit, it may be so simultaneously, or not at the same time. Additionally, other procedures associated with manufacturing the bearing, including assembling, heating, pressurizing, and cleaning may as needed be effected in between the first step and the second step, or between the second step and the third step.

Embodying the second aspect of the invention improves the wettability, in the dry-area face(s), between the dry-area face(s) and the oil repellant. This improved wettability prevents the oil repellant from exfoliating (peeling off). Accordingly, lubricating fluid is prevented from migrating by wetting-diffusion over the dry-area face(s) continuous with the capillary seal.

Since in particular the dry-area face of the rotor unit is susceptible to wetting diffusion due to centrifugal force when the rotor unit spins, the fourth step is advantageously effected on the dry-area face of the rotor unit so that the oil repellant does not peel off.

In the second aspect of the present invention, further advantageously a surface-treating process consisting of at least one between plasma irradiation and ultraviolet irradiation is implemented on one of either of the stator unit and rotor unit where the capillary seal section is formed.

Moreover, inasmuch as the face(s) constituting the dry-area face(s), and the surfaces constituting the capillary seal section adjoin each other, treating the surfaces at the same time makes for efficient manufacturing work.

The foregoing surface-treating processes improve the lubricating-fluid retaining ability of the capillary seal section and prevent the oil repellant from peeling off, which all the more effectively prevents the lubricating fluid from leaking out.

Further to the second aspect of the present invention, advantageously at least one among the stator-unit and rotor-unit surfaces that constitute the capillary seal section is formed of a resin material. Resins are readily activated at the surface by plasma irradiation or ultraviolet-beam irradiation, and thus constituting the seal-section surface(s) from a resin material improves the cohesion between the surface(s) and the oil repellant.

Still further to the second aspect of the invention, the dry-area face on at least one of either of the stator-unit side and the rotor-unit side of the bearing may be formed of metal. In the manufacturing method in that case, advantageously the surface-treating process, by means of at least one between plasma irradiation and ultraviolet-beam irradiation, is carried out over a broader extent on the metal components. Plasma-based cleaning or cleaning using ultraviolet beams dissolves grease and other grime clinging to the metal surfaces, and therefore are ideally suited to the cleaning of bearing components, in which a high level of cleanliness is mandatory. Also, the cleaning process and the surface-treating process may be carried out at the same time, which makes for excellent operability of the manufacturing method.

Yet further to the second aspect of the present invention, at least one surface-treating process among the group of surface-treating processes consisting of plasma irradiation and ultraviolet-beam irradiation is implemented on at least any one surface among the stator-unit and rotor-unit surfaces that constitute the micro-gap.

The surfaces of the micro-gap constitute the bearing faces of the fluid dynamic-pressure bearing. Improving the wettability of the surfaces for the lubricating fluid enhances the bearing's ability to retain lubricating fluid between the stator-unit surfaces and the rotor-unit surfaces. The heightened inter-surface lubricant retaining ability contributes to preventing the stator-unit surfaces and rotor-unit surfaces from contacting, even as the bearing withstands stronger shocks and vibrations.

A spindle motor to which a spindle-motor manufacturing method that is a second aspect of the present invention is applicable has the following configuration. Namely, the spindle motor is furnished with a base component, a stator unit fixed to the base component, and a rotor unit supported to let it rotate with respect to the stator unit. The base component is the baseplate of the spindle motor. In implementations in which the spindle motor is a DC brushless motor, a stator around which coils are wound is anchored to the base component or to the stator unit.

The stator unit defines an outer circumferential surface. The base component is furnished with an adhesion surface of conformation corresponding to the form of the stator-unit outer circumferential surface. The stator unit is adhesively affixed to the base component.

The third aspect of the present invention, being a spindle-motor manufacturing method as just set forth, includes the following first through third steps. Namely, in the first step, at least one surface-treating process among the group of surface-treating processes consisting of plasma irradiation and ultraviolet-beam irradiation is implemented on at least one of either of the outer circumferential surface of the stator unit or the adhesion surface of the base component. In the second step, which is effected following the first step, an adhesive agent is applied to at least one of either of the outer circumferential surface of the stator unit or the adhesion surface of the base component.

Subsequently, in the third step, the stator unit is inset into the base component, with the stator-unit outer circumferential surface fitting to the base-component adhesion surface, whereby the stator unit and the base component cohere via the adhesive agent. Furthermore in the third step, the adhesive agent is hardened to fix the stator unit to the base component. Examples of how the adhesive agent would be hardened include: by heating it, if the adhesive is thermosetting; by shielding it from the air, if the adhesive is anaerobic; by irradiating it with an ultraviolet beam if the adhesive is UV curing; and by mixing it with a hardener if the adhesive involves a two-component system.

Embodying the third aspect of the invention improves the wettability, with respect to organic substances, of the surfaces adhered by the adhesive agent, which therefore improves the cohesiveness between the adhesive agent and the adhering surfaces. In this way the adhesive strength when the adhesive is set improves. Moreover, the fact that the wettability of the surfaces for the adhesive agent is improved enables the adhesive to enter into the narrow gap between the stator unit and the base component to yield more powerful adhesive strength. The spindle motor is therefore made tougher, especially against disturbances such as shock and vibration, which makes for longer motor lifespan.

Further to the third aspect of the present invention, advantageously at least one between the outer circumferential surface of the stator unit and the adhesion surface of the baseplate is formed of a resin material. Resins are readily activated at the surface by plasma irradiation or ultraviolet-beam irradiation, and thus constituting the stator-unit/baseplate surface(s) from a resin material improves the wettability between the surface(s) and the adhesive agent.

Further yet to the third aspect of the invention, at least one of either of the outer circumferential surface of the stator unit and the adhesion surface of the baseplate may be formed of metal. In the manufacturing method in that case, advantageously the surface-treating process, by means of at least one between plasma irradiation and ultraviolet-beam irradiation, is carried out over a broader extent on the stator unit and the baseplate. Plasma-based cleaning or cleaning using ultraviolet beams dissolves grease and other grime clinging to the metal surfaces, and therefore are ideally suited to the cleaning of spindle motors, in which a high level of cleanliness is mandatory. Also, the cleaning process and the surface-treating process may be carried out at the same time, which makes for excellent operability of the manufacturing method.

The performance of the capillary seal section in a spindle motor utilizing a fluid-dynamic-pressure bearing manufactured by a manufacturing method of the first aspect of the present invention is superior, and this heightened capillary-seal performance contributes to producing spindle motors that are of extended lifespan and are tough against impact.

In turn, a spindle motor utilizing a fluid-dynamic-pressure bearing manufactured by a manufacturing method of the second aspect of the invention enables the surfaces onto which the oil repellant is applied to maintain stabilized oil repellency, which, by preventing wetting diffusion of the lubricating fluid, contributes to producing spindle motors of prolonged lifespan.

A recording-disk drive utilizing a spindle motor manufactured by a manufacturing method of the third aspect of the present invention especially improves the motor's longevity and resistance to impact. In implementations in which the base component constitutes part of the disk-drive case, exit/entry of air internal/external to the recording-disk drive can be prevented, which keep contaminants from entering into the interior of the case.

From the following detailed description in conjunction with the accompanying drawings, the foregoing and other objects, features, aspects and advantages of the present invention will become readily apparent to those skilled in the art.

DETAILED DESCRIPTION OF THE INVENTION

Figure 1:
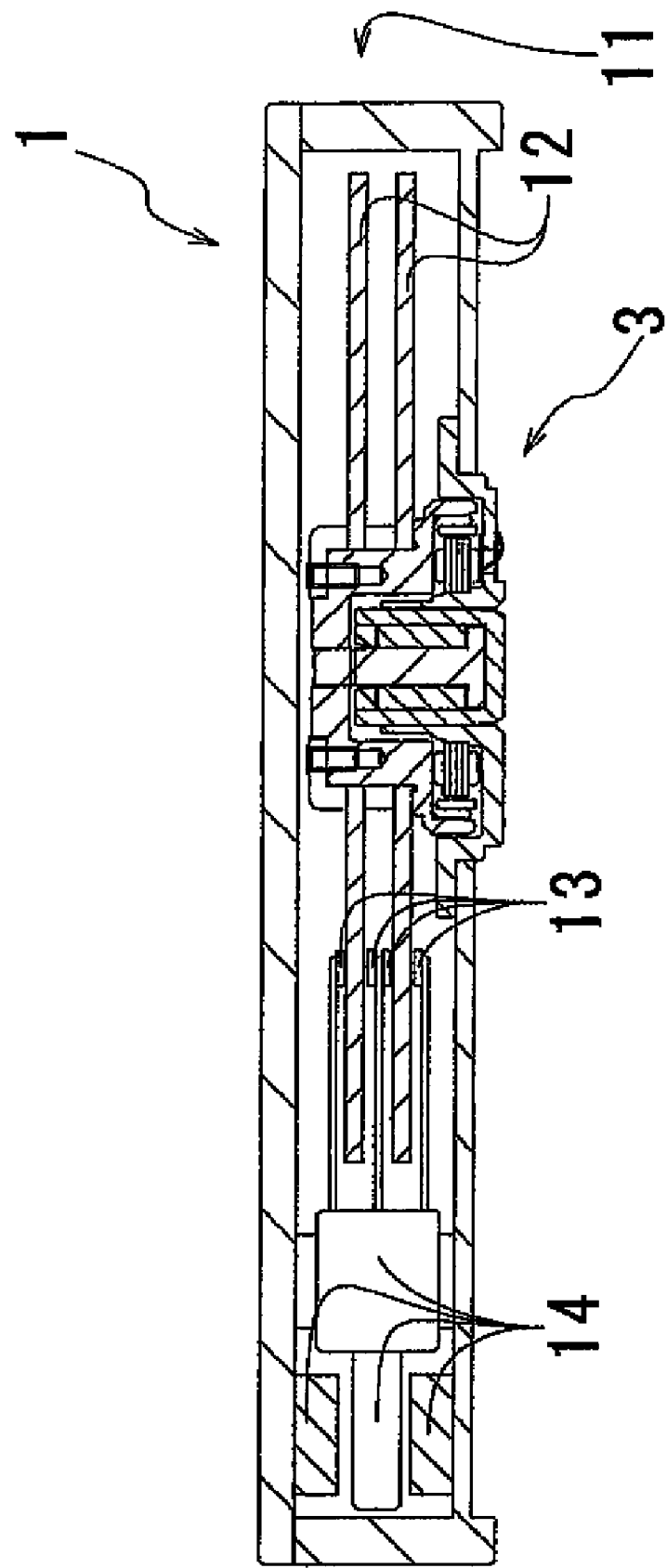
FIG. 1 is a sectional view of a recording-disk drive of the present invention.

An explanation of modes of embodying the present invention will be made while referring to the drawings. It should be understood that in the description of the embodiments, when terms that indicate directions are used without special notation, the terms indicate directions represented in the drawings; consequently such noting does not limit orientations in embodying the invention.

First Embodiment

In the present embodiment, a fluid-dynamic-pressure bearing for which a manufacturing method of the present invention is utilized is employed in a spindle motor 3 that spins discoid recording media.

Hard-Disk Drive

Reference is made to FIG. 1, which is a sectional view illustrating a hard-disk drive 1 that is a recording-disk drive device embodying the present invention. The hard-disk drive 1 is in the interior of a case 11 furnished with a spindle motor 3 that spins recording disks 12, heads 13 that read information from and write information into the recording disks 12, and an actuator unit 14 that shifts the heads 13 into select locations over the recording disks 12.

Spindle Motor Configurational Outline

Figure 2:
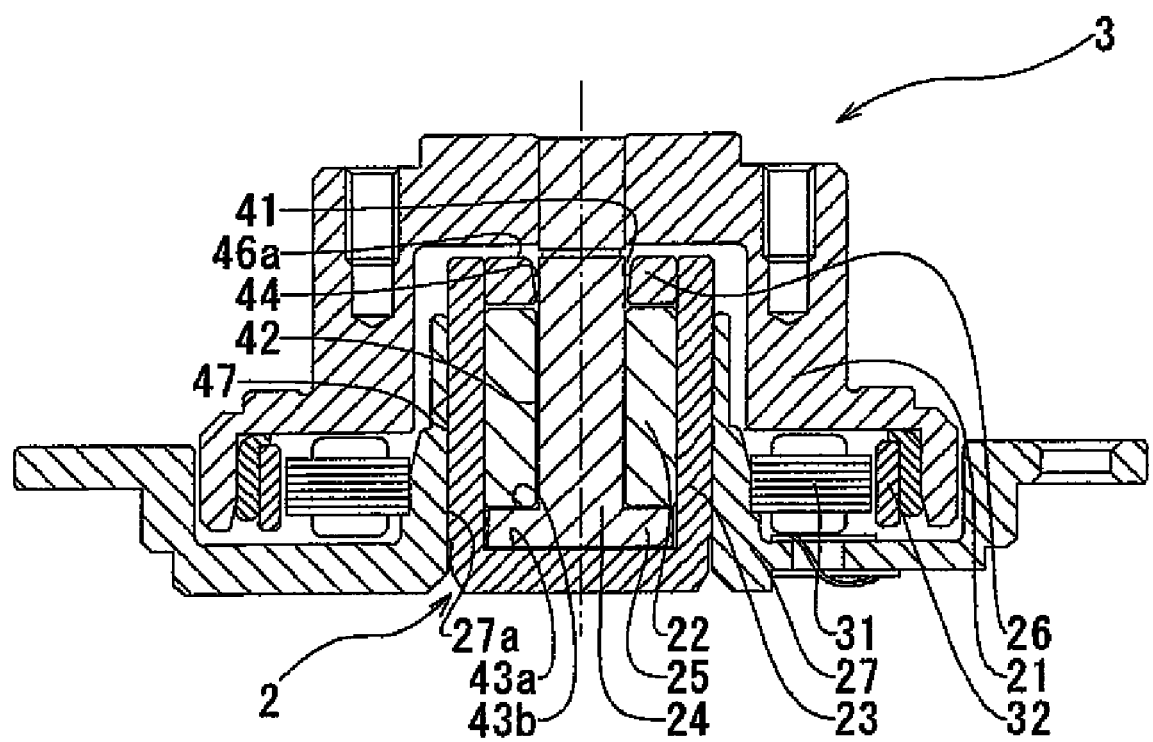
FIG. 2 is a sectional view of a fluid-dynamic-pressure bearing, and a spindle motor in which the bearing is utilized, involving a first embodiment of the present invention.

The spindle motor 3 is, as depicted in FIG. 2, furnished with: a rotor hub 21 having a carrying surface on which the recording disks 12 are carried; a toroidal rotor magnet 32 attached to the rotor hub 21; a bracket 27 that serves as the base component; a stator 31 made up of a plurality of coils; and a fluid-dynamic-pressure bearing 2 that rotatively supports the rotor hub 21 and rotor magnet 32 with respect to the bracket 27 and stator 31. The stator 31 is fixed to the bracket 27, radially opposing the inner circumferential surface of the rotor magnet 32. The fluid-dynamic-pressure bearing 2 is mounted in, unitized with, the bracket 21. It should be noted that the bracket 27 may be integrated with the case 11 to constitute the baseplate (base component).

Fluid-Dynamic-Pressure Bearing Configuration

The fluid-dynamic-pressure bearing 2 is furnished with: a shaft 24 fixed into the rotor hub 21; a sleeve 22 fit over the shaft 24; a substantially cup-shaped bearing housing 23 on the radially outer side of the sleeve 22, and into which the sleeve 22 is inset; and a seal bushing 26 mounted in a location to the upper side of the sleeve 22. The rotor hub 21 and the shaft 24 constitute the rotor unit; the bearing housing 23, the sleeve 22, and the seal bushing 26 constitute the stator unit.

The shaft 24 defines a cylindrical outer circumferential surface. The sleeve 22 is formed of a sintered porous metal, and the sleeve 22 defines a cylindrical inner circumferential surface that radially opposes the outer circumferential surface of the shaft 24. The outer circumferential surface of the sleeve 22 is adhesively affixed to the inner circumferential surface of the bearing housing 23. The bearing housing 23 is formed of a resin such as a liquid-crystalline polymer.

Radially extending and axially extending gaps between the shaft 24 and the sleeve 22 are charged with and retain a lubricating fluid 35. An ester-based or a poly(.alpha.-olefin) based oil is, for example, utilized as the lubricating fluid 35. It will be appreciated that for the lubricating fluid 35, oils or other liquids appropriately selected and adjusted according to the how the lubricating fluid is to perform may be utilized.

At least a portion of the outer circumferential surface of the shaft 24 and of the inner circumferential surface of the sleeve 22 are radially spaced apart by several μm, wherein a radial dynamic-pressure bearing 42 is formed. The shaft 24 is flanged adjacent the end on its lower side, forming a radially outward extending flange 25, and the upper and lower surfaces of the flange 25 axially oppose the bottom surface of the bearing housing 23 and the lower endface of the sleeve 22, wherein respective thrust dynamic-pressure bearings 43a and 43b are constituted.

The radial dynamic-pressure bearing 42 and the thrust dynamic-pressure bearings 43 rotatively support the shaft 24 and the rotor hub 21 with respect to the sleeve 22, by the force of pressure produced due to the difference in flow speed of the lubricating fluid 35 retained in the gaps in between the rotating shaft 24 and the sleeve 22 opposing the shaft. Further, dynamic-pressure grooves (not illustrated) of herringbone conformation, that when the shaft 24 rotates with respect to the sleeve 22 exert a pumping action on the lubricating fluid 35 in a direction gathering the fluid into an axial stretch of the radial dynamic-pressure bearing 42, are formed on the radial-bearing constituting, inner-circumferential surface of the sleeve 22.

Figure 5:
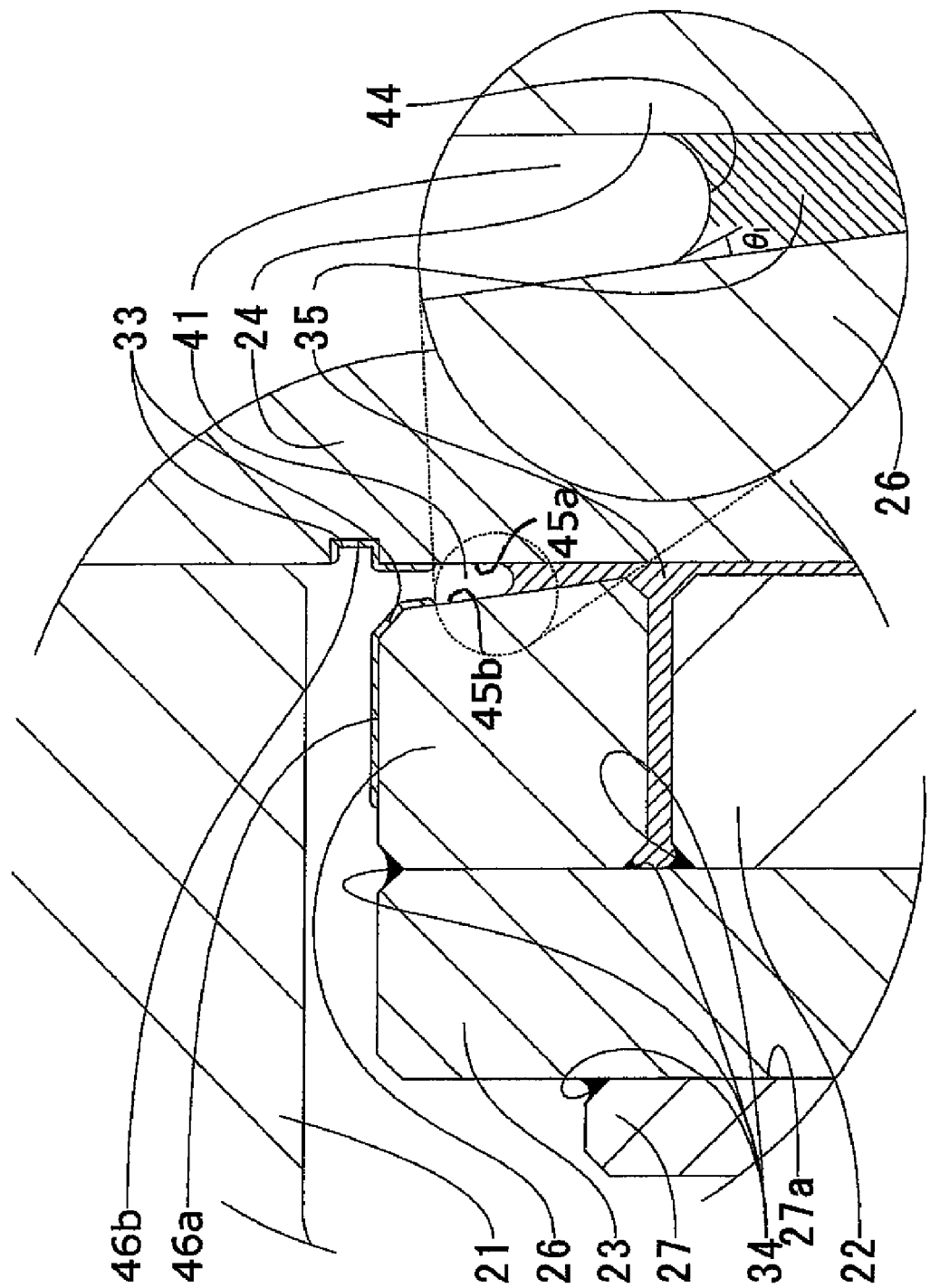
FIG. 5 is an enlarged fragmentary sectional view, in which a blowup of the capillary seal section is inset, illustrating key features of a fluid-dynamic-pressure bearing of the present invention.

The description now turns to FIG. 5, which is a fragmentary view enlarged from FIG. 2 to show key features of the seal bushing 26 and the shaft 24. The interval between the outer circumferential surface of the shaft 24 and the inner circumferential surface of the seal bushing 26 flares as the spacing heads upward. Herein the bearing 2 is configured so that at the lower end of the seal bushing 26 the spacing is about 20 µm, and at the upper end of the seal bushing 26 it is about 300 µm. In the spacing, a boundary surface 44 between the lubricating fluid 35 and the external atmosphere forms, constituting a capillary seal. The position of the boundary surface 44 is determined by the measure of surface tension acting on the interface between the lubricating fluid 35 and the external atmosphere; the stronger this surface tension is, the more stably the boundary surface 44 is maintained. The size of the spacing for the capillary seal, and the size θ1 of the wetting angle between the lubricating fluid 35 and the surfaces that constitute a capillary seal section 41 greatly influence the strength of the surface tension.

Manufacturing Method

Figure 6:
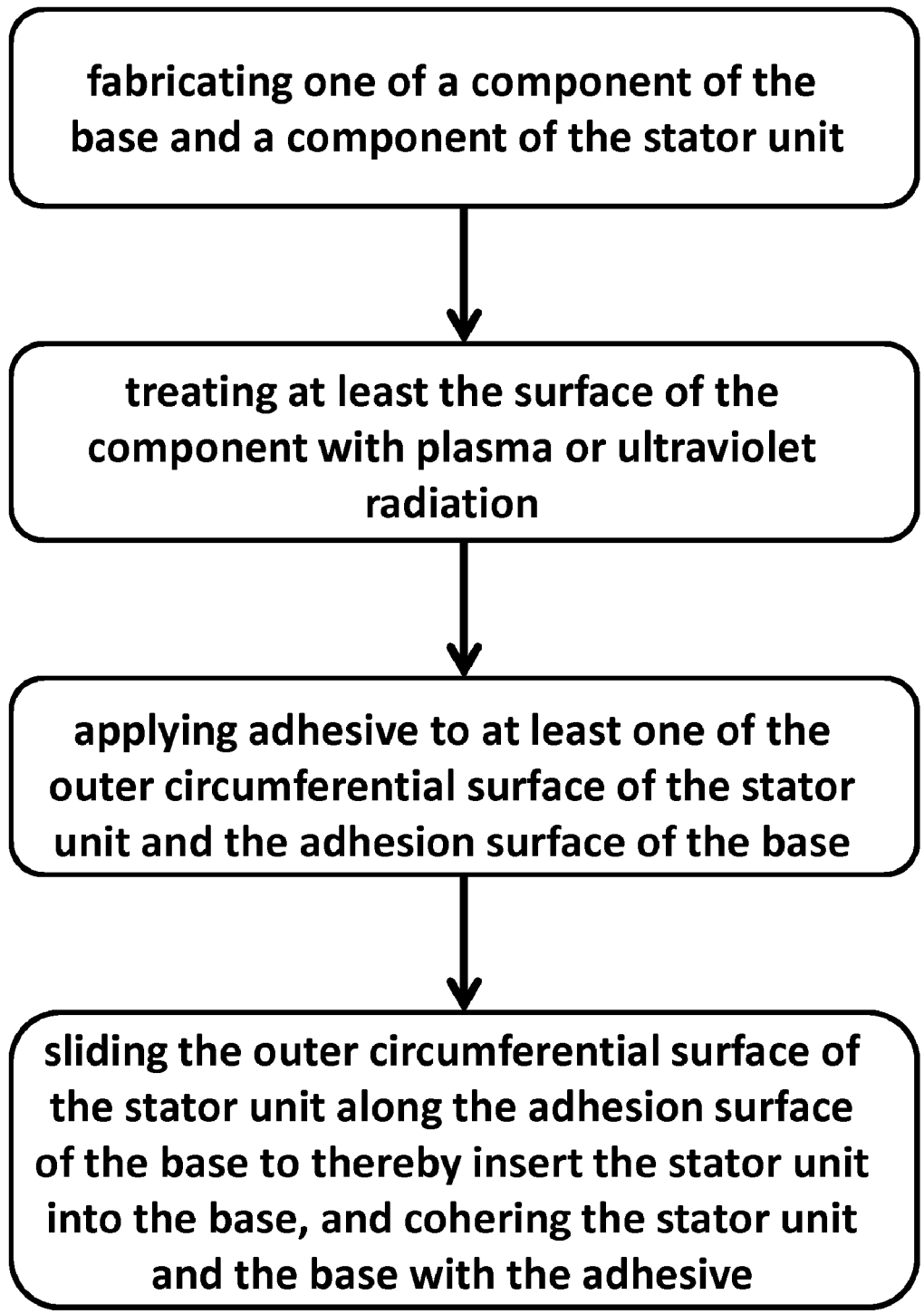
FIG. 6 is a flowchart showing a preferred embodiment of a method used to manufacture a spindle motor in accordance with the present invention.

A preferred embodiment of a method of manufacturing a spindle motor is described below with reference to FIG. 6.

Processing & Cleaning

Namely, to begin with the rotor hub 21, the sleeve 22, the bearing housing 23, the shaft 24, the seal bushing 26, and the base component 27 are respectively machined/formed. Thereafter the components are cleaned. Purified water, solvents, acidic/alkaline solutions, surface-active agents, etc. are utilized for the cleaning.

Herein, cleaning by means of ultraviolet-beam irradiation or plasma, such as UV-ozone cleaning, may be carried out. Cleaning employing UV rays or plasma makes it possible to achieve highly effective cleansing on grime due to organic residues. What is more, both the liquid-based and irradiation-based cleaning processes may be carried out jointly.

UV-Beam Irradiation of Sleeve Outer Circumferential Surface

Next, the outer circumferential surface of the sleeve 22 is irradiated with an ultraviolet beam. The UV beam has a distinct spectrum that, for example, with a mercury lamp is 365 nm, and in an implementation in which a low-pressure mercury lamp is utilized, is 185 nm, 254 nm; and in an implementation in which an excimer lamp is utilized, the spectrum is 126 nm, 146 nm, 172 nm, 222 nm. In order to have the irradiation be UV rays in a specific bandwidth alone, the light can be put through filtering and beam-splitting as required to render single-wavelength components exclusively. The exposure duration is about 20 seconds.

Subsequently the outer circumferential surface of the bearing housing 23 is irradiated with an ultraviolet beam. The UV irradiation is equivalent to that effected on the outer circumferential surface of the sleeve 22. The exposure duration is about 20 seconds.

UV-Beam Irradiation of Seal Bushing

Next, the upper endface and the inner circumferential surface of the seal bushing 26 are irradiated with an ultraviolet beam. The UV beam is the same as that with which the outer circumferential surface of the sleeve 22 is irradiated, and is output from the same light source. The exposure duration is about 20 seconds, and the cumulative dose is set to be 35 kJ/m². The upper endface of the seal bushing 26 serves as a stator-side oil-repellant application surface 46a, while the inner circumferential surface of the seal bushing 26 serves as a stator-side, capillary seal section 41 constituting seal surface 45b.

It will be appreciated that these UV exposure operations enable surface-cleansing effectiveness to be achieved. Cleaning employing ultraviolet rays or plasma makes it possible to achieve highly effective cleansing on grime due organic residues.

Assembly

Next, the shaft 24 is inserted into the sleeve 22, and the sleeve-shaft assembly is inset into the bearing housing 23. The sleeve 22 outer-circumferential surface and the bearing housing 23 inner-circumferential surface are adhesively affixed to each other. Insetting the sleeve 22 by press-fitting it into the bearing housing 23 runs the risk that warpage in the sleeve 22 will occur, but adhesive affixation enables the sleeve 22 to be bound to the bearing housing 23 without distorting the sleeve 22. Furthermore, since the outer circumferential surface of the sleeve 22 prior to assembly has been irradiated with ultraviolet rays, the adhesive 34 coheres readily to the sleeve surface, dramatically improving the adhesive strength between the sleeve 22 and the bearing housing 23.

Subsequently, the seal bushing 26 is inset into the bearing housing 23 and adhesively affixed to the housing inner-circumferential surface. The portion of the shaft 24 that opposes the inner circumferential surface of the seal bushing 26 serves as a rotor-side, capillary seal section 41 constituting seal surface 45a.

Applying Repellant 33

In the next stage in the bearing 2 manufacturing process, an oil repellant 33 is applied to a rotor-side oil-repellant application surface 46b located to the upper side of the seal surface 45b of the shaft 24. The oil repellant 33 is applied with a special dispenser for that purpose. A groove that serves to mark the location where the repellant 33 is applied is formed in the oil-repellant application surface 46b of the shaft.

Infusing Lubricating Fluid 35

Next, through the gap between the seal bushing 26 and the shaft 24, lubricating fluid 35 is infused into the gap between the radial dynamic-pressure bearing 42 and the thrust dynamic-pressure bearings 43. While the assembly is under a vacuum, the lubricating fluid 35 is poured in so as to conceal the gap between the seal bushing 26 and the shaft 24; the assembly is then gradually returned to near atmospheric pressure, whereby the lubricating fluid 35 enters into and is retained within the gaps that constitute the radial and thrust dynamic-pressure bearings. The lubricating fluid 35 is infused in an amount by which the interior of the gaps will be filled with the lubricating fluid 35.

Subsequently, whether the lubricating fluid 35 is the appropriate amount is examined by gauging the height of the boundary surface 44 between the lubricating fluid 35 and the external atmosphere. When the lubricating fluid 35 is the proper quantity, the locus of the boundary surface 44 will form in between the stator-side seal surface 45a and the rotor-side seal surface 45b.

By the foregoing method, a fluid dynamic-pressure bearing 2 made up of the sleeve 22, the bearing housing 23, the shaft 24, the seal bushing 26, and the lubricating fluid 35 retained in the radial fluid dynamic-pressure bearing 45 and the thrust fluid dynamic-pressure bearings 43 is completed.

Mounting Rotor Hub

The rotor hub 21 onto which the rotor magnet 32 has been attached is mounted onto the shaft 24 by press-fitting the hub onto the shaft upper end. As a means to improve the binding strength, as well as in order to prevent deformation of the components, the hub may be fixed to the shaft using an adhesive.

Anchoring Bearing Unit to Base

Next, the bearing housing 23 is adhesively affixed to the bracket 27 onto which the stator 31 has been mounted. A mounting hole 27a of substantially the same conformation as the outer circumferential surface of the bearing housing 23 is formed in the bracket 27. With the adhesive 34 intervening, the outer circumferential surface of the bearing housing 23 is snugged along the inner circumferential surface constituting the mounting hole 27a, to which the housing circumferential surface is thereby adhesively affixed. Since the outer circumferential surface of the bearing housing 23 has been irradiated with ultraviolet rays prior to fixing the housing into the bracket, the adhesive 34 coheres readily to the housing surface, dramatically improving the adhesive strength between the outer circumferential surface of the bearing housing 23 and the mounting hole 27a in the bracket 27.

A spindle motor 3 is manufactured through these steps.

Embodiment Effects/Results

The change in wetting angle in the capillary seal section 41 of a fluid-dynamic-pressure bearing 2 in the first embodiment, manufactured according to a manufacturing method of the present invention, will be given in the following. When an ester-based oil was employed as the lubricating fluid 35, its wetting angle with the seal bushing 26 prior to being exposed to ultraviolet rays was about 60.degree. The wetting angle after a 20-second exposure with a UV beam having a principal wavelength of 185 nm became 20-30.degree. Quite clearly, then, the wetting angle was extraordinarily reduced. Moreover, even after seven days post UV-exposure the wetting angle remained essentially unchanged.

Prior to implementing the UV-exposure operation in manufacturing the fluid-dynamic-pressure bearings, the oil repellant 33 was extremely prone to peeling off, making necessary manufacturing operations to discern the post-application peeling and reapply the repellant over again. In contrast, the cohesiveness of the oil repellant 33 for seal surfaces irradiated for 20 seconds with a UV beam having a principal wavelength of 185 nm was excellent, and thus in post-application inspections, there were almost no articles deemed to require reapplication of the repellant. Consequently, reapplication work was rendered practically unnecessary.

The diameter of the bearing housing 23 is about 10 mm, and the length of the mating fit between the bearing housing 23 and the mounting hole in the bracket 27 is about 5 mm. Acryl-based anaerobic, UV-curing adhesive agents, and epoxy-based thermosetting adhesive agents have each been employed to date as the adhesive 34. Prior to implementing the UV-exposure operation in manufacturing the fluid-dynamic-pressure bearings, the force required to pull the bearing housing 23 of a dynamic-pressure bearing 2 out of the bracket 27 was 30-100 kgf. In contrast, the force required to pull the bearing housing 23 of a fluid-dynamic-pressure bearing 2 out of the bracket 27 when the gluing operation is carried out under the same conditions, after the adhesion surface of the housing has been irradiated for 20 seconds with a UV beam having a principal wavelength of 185 nm, is a dramatically improved 60-120 kgf. Moreover, since the adhesive readily coheres to the component surfaces, the adhesive spreads uniformly along the joining faces. Breaches between the adhesive and the components are consequently not liable to form, which thus makes it all the more possible to keep contamination from the exterior from passing through such breaches and invading the interior of a recording-disk drive.

Second Embodiment

Figure 3:
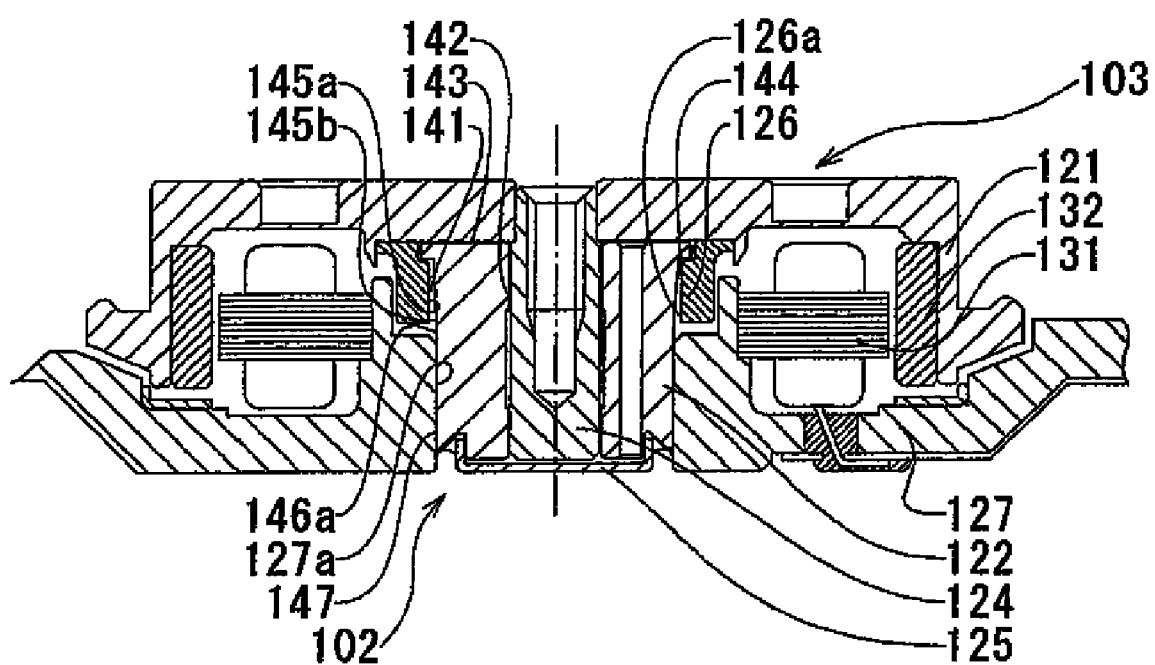
FIG. 3 is a sectional view of a fluid-dynamic-pressure bearing, and a spindle motor in which the bearing is utilized, involving a second embodiment of the present invention.

Spindle motor 103, as illustrated in FIG. 3, is utilized as an alternative to spindle motor 3 in the first embodiment. The recording disks 12 are carried on and spun by a rotor hub 121 of the spindle motor 103.

The spindle motor 103 is, in a like manner as in the first embodiment, made up of a fluid-dynamic-pressure bearing 102, a stator 32, and a rotor magnet 132. Likewise, in the spindle motor 103, a baseplate 127 that constitutes a part of the case 11 for the recording-disk drive 1 serves as the base component.

The fluid-dynamic-pressure bearing 102 includes: a columnar shaft 124 mounted in the rotational center portion of the rotor hub 121; a sleeve 122 having an inner circumferential surface that radially opposes the outer circumferential surface of the shaft 124; and the rotor hub 121, which has an underside surface that axially opposes the upper endface of the sleeve 122. The shaft 124 is composed of a hardened martensitic stainless steel, and the sleeve 122 is composed of a free-machining stainless steel. A cylindrical wall member 126 encompassing the sleeve 122 is attached to the rotor hub 121. The inner circumferential surface 126a of the cylindrical wall member 126 diametrically opposes the outer circumferential surface of the sleeve 122. The rotor hub 121, the shaft 124, and the rotor magnet 132 constitute the rotor unit of the spindle motor 103. Meanwhile, the sleeve 122, a stator 131, and the baseplate 127 form the stator unit of the spindle motor 103.

At least a portion of the diametric gap between the outer circumferential surface of the shaft 124 and the inner circumferential surface of the sleeve 122 is rendered to measure some several .mu.m. Likewise, a portion of the axial gap between the upper endface of the sleeve 122 and the underside surface of the rotor hub 121 is rendered to measure several to 20.mu.m or so. Lubricating fluid 35 fills and is retained by these gaps: In the diametric gap, lubricating fluid 35 is retained, forming a radial dynamic-pressure bearing 142; and in the axial gap, lubricating fluid 35 is retained, forming a thrust dynamic-pressure bearing 143. Furthermore, the inner circumferential surface 126a of the cylindrical wall member 126 is a rotor-side seal surface 145a. Along the outer circumferential surface of the sleeve 122, the portion that opposes the rotor-side seal surface 145a is a stator-side seal surface 145b. The diametrical clearance between the rotor-side seal surface 145a and the stator-side seal surface 145b flares going from the upper end to the lower end of the clearance. This clearance constitutes a capillary seal section 141. In the clearance constituting the capillary seal section 141, a boundary surface 144 between the lubricating fluid 35 and the external atmosphere forms.

A method of manufacturing a fluid-dynamic-pressure bearing as set forth above is as follows.

Namely, as is the case in the first embodiment, each component is machined/formed, and then the components are cleaned.

Next, a plasma surface-treating process is implemented on the outer circumferential surface of the sleeve 122. In the present embodiment, ozone cleaning is utilized for the plasma surface-treating process. Ozone cleaning is carried out by ozonizing oxygen with an ultraviolet beam and exposing the outer circumferential surface of the sleeve 122 with the resulting ozonic plasma. It will be appreciated that grease and other organic residues clinging to the component surfaces can be cleaned simultaneously with the surface treating process.

Herein, the plasma surface-treating process may be implemented on the inner circumferential surface 126a of the cylindrical wall member 126 on the rotor hub 121, and on the vicinity of the mounting hole in the baseplate 127.

Next, the shaft 124 is mounted into the rotor hub 121. Then the sleeve 122 is fit over the shaft 124, and the cylindrical wall member 126 is attached to the underside face of the rotor hub 121. The cylindrical wall member 126 thus serves to lock the rotor hub 121 against coming out of the sleeve 122. The lower end (bottom) of the sleeve 122 is then covered with an endplate 125. Thus the interior of the sleeve 122 is made into a hermetic space.

Subsequently, along the outer circumferential side of the sleeve 122, in an area located to the lower side of the stator-side seal surface 145b, oil repellant 33 is applied circuiting the circumference. The outer circumferential surface of the sleeve 122 onto which oil repellant 33 is applied serves as a stator-side oil-repellant application surface 146a. In turn, oil repellant 33 is also applied to the lower part of the inner circumferential surface 126a of the cylindrical wall member 126. The inner circumferential surface 126a of the cylindrical wall member 126 onto which oil repellant 33 is applied serves as a rotor-side oil-repellant application surface 146b. The bearing-manufacturing method then continues by heating the fluid-dynamic-pressure bearing 102 to about 100° C. in order to cohere the oil repellant 33 to the oil-repellant application surfaces 146. Regarding the efficacy of the plasma surface-treating process, it is to be noted that there was no diminishment of the resulting effectiveness even if the bearing was heated to as much as 120° C.

At this point lubricating fluid 35 is passed through the capillary seal section 141 to charge the radial dynamic-pressure bearing 142 and thrust dynamic-pressure bearing 143 gaps with the fluid. Under a vacuum environment, with the sleeve 122 up and thus the rotor hub 121 down, lubricating fluid 35 is pooled in the capillary seal section 141 opening. The volume of lubricating fluid is the amount according to which the fluid-atmosphere boundary surface will form within the limits defined by the capillary seal section 141. After the bearing has been charged with lubricating fluid 35, a check/inspection is made as to whether the boundary surface has formed in the correct position. The bearing environment is thereafter repressurized gradually to atmospheric pressure, whereby the gaps are filled with the lubricating fluid 35. Therein, the lubricating fluid 35 is stably retained within the bearing gaps by capillary force acting in the gaps.

Next, the fluid dynamic-pressure bearing 102 is adhesively affixed into the baseplate 127. A round mounting hole that closely matches the outer circumferential surface of the sleeve 122 is formed in the baseplate 127. Adhesive 34 is applied to the inner circumferential surface of the mounting hole, into which the sleeve 127 is then inset.

The stator 131 has in advance been mounted on the baseplate 127, while the rotor magnet 132 has in advance been attached to the rotor hub 121. In the foregoing way, the spindle motor 103 is completed.

It was confirmed that the effect on the wetting angle of the lubricating fluid 35 in the capillary seal section 141 in the present embodiment was substantially equivalent to that when the bearing components were UV-irradiated in the implementation in which an ultraviolet beam and the same lubricating agent were utilized.

Similar effectiveness in making the oil repellant 35 less likely to peel off was also confirmed. In particular, in the bearing having been heated after application of the oil repellant, the oil-repellant application surface 146b, which had been surface-treated with the plasma, was scrubbed several dozen times at a force of 100 gf using a rag, yet no oil repellant was observed stuck to the rag. As will be understood from these confirmations, by applying the oil repellant 33 to the stator-side oil-repellant application surface 146a having undergone the plasma-based superficial treating process, the cohesiveness of the oil repellant 33 is extraordinarily improved.

What is more, the adhesive strength between the baseplate 127 and the sleeve 122 is also improved, being at least more than twice the binding strength compared with the situation in which the surfaces are not plasma-treated. Consequently, the durability of the assembly against shock or other impact improves dramatically.

Third Embodiment

Figure 4:
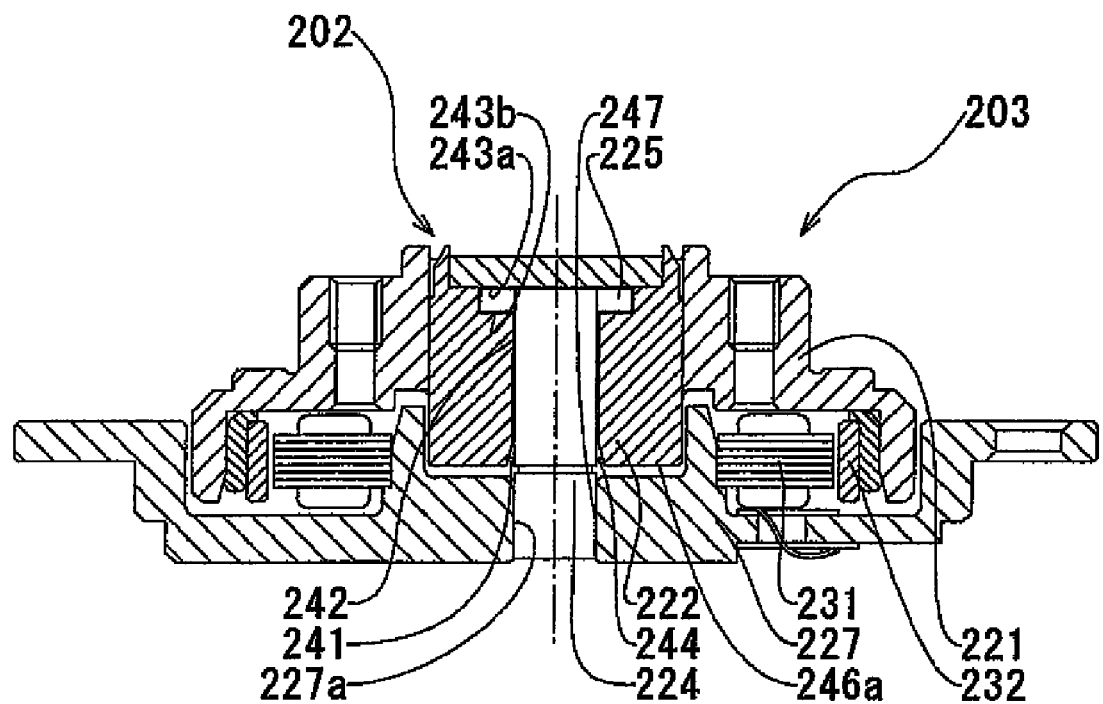
FIG. 4 is a sectional view of a fluid-dynamic-pressure bearing, and a spindle motor in which the bearing is utilized, involving a third embodiment of the present invention.

The description now turns to FIG. 4, which is a diagram illustrating a spindle motor 203 and a fluid dynamic-pressure bearing 202 in yet another embodiment of the present invention.

FIG. 4 is of a fluid dynamic-pressure bearing 202 in which the shaft 224 is anchored into the bracket 227. This fluid dynamic-pressure bearing 202 is made up of: a sleeve 222 mounted in a rotor hub 221 of the spindle motor 203; the shaft 224, which is inserted into the sleeve 222; and a flange 225 that is mounted on the upper-end part of the shaft 224. The gap between the sleeve 222 and the shaft 224 is charged with and retains lubricating fluid 35. A radial dynamic-pressure bearing 242 is formed in between the outer circumferential surface of the shaft 224 and the inner circumferential surface of the sleeve 222. Furthermore, thrust dynamic-pressure bearings 243a and 243b are formed in between the top and bottom surfaces of the flange 225, and the sleeve 222 where it axially opposes the top/bottom surfaces.

In this fluid dynamic-pressure bearing 202, the outer circumferential surface of the sleeve 222 and the lower endface of the sleeve 222 are subjected to a plasma-based surface-treating process. It should be understood that these areas may also be inadiated with an ultraviolet beam. This surface-treating step may be either before or after assembling the fluid dynamic-pressure bearing 202.

Oil repellant 33 is applied to the lower endface of the sleeve 222, after which the surface is heated to render a rotor-side oil-repellant application surface 246a.

Next, lubricating fluid 35 is infused into the gaps by which the radial dynamic-pressure bearing 242 and the thrust dynamic-pressure bearings 243 are formed. The lubricating-fluid 35 infusion method is the same as that of the first embodiment.

The outer circumferential surface of the sleeve 222 is inset into a mounting hole 227a provided in the bracket 227, with adhesive 34 intervening. A fluid dynamic-pressure bearing 202 of the third embodiment, owing to its retaining the lubricating fluid 35 stably, has a long lifespan; wherein leakage of the lubricating fluid 35 in reaction to impact is restrained. In addition, in the spindle motor 203 also, the adhesive strength between the bracket 227 and the fluid dynamic-pressure bearing 202 is tough, which lends the motor an enhanced capacity to withstand impact.

It should be understood that the present invention is not limited only to the scope set forth in the embodiments, in that various modifications within a scope that does not depart from the gist of the present invention are possible. For example, substantially similar efficacy can be achieved by carrying out whichever of the surface treatments-whether it be a surface-treating process by ultraviolet-beam irradiation, or a plasma-based surface-treating process. Plasma-based surface-treating processes comprehend various sorts of cleaning devices, such as those for ion cleaning, ozone cleaning, or UV-ozone cleaning, as well as irradiation by charged-particle beams and high-energy RF radiation.

Furthermore, of fluid dynamic-pressure bearings of the various structures that have been employed to date, the present invention is applicable to fluid dynamic-pressure bearings furnished with a capillary seal. Likewise, the present invention is applicable to spindle-motor implementations in which the fluid dynamic-pressure bearing and other components are joined by means of an adhesive, regardless of the form of the motor or the form of the bearing.

Other modifications include that the type of adhesive agent, the type of oil repellant, the type of lubricating agent, and the materials and substances of the components that constitute the fluid dynamic-pressure bearing and the spindle motor may be varied according to use and design. Likewise, recording-disk drives of the present invention are not necessarily limited to hard-disk drives; the present invention may be utilized in various sorts of recording-disk drives, such as removable disk drives, optical disk drives, and magneto-optical disk drives. Still further, a fluid dynamic-pressure bearing manufacturing method of the present invention may be utilized in implementations in which bearings are manufactured for motors—such as motors for polygonal mirrors, and fan motors—that spin at high speed and in which a high degree of rotational precision is mandatory.

What is claimed is:

1. A method in the manufacturing of a spindle motor which includes a base, and a stator unit received in the base with an outer circumferential surface of the stator unit facing an adhesion surface of the base, the method comprising:
    fabricating one of a component of the base and a component of the stator unit of resin, a surface of the component fabricated of resin constituting the outer circumferential surface of the stator unit or the adhesion surface of the base;
    treating at least the surface of the component fabricated of resin with plasma or ultraviolet radiation, wherein at least one of the outer circumferential surface of the stator unit and the adhesion surface of the base is surface-treated with plasma or ultraviolet radiation;
    applying adhesive to at least one of the outer circumferential surface of the stator unit and the adhesion surface of the base; and
    subsequently sliding the outer circumferential surface of the stator unit along the adhesion surface of the base to thereby insert the stator unit into the base, and cohering the stator unit and the base with the adhesive.

2. A manufacturing method as set forth in claim 1, further comprising fabricating the other of the component of the base and the component of the stator unit of metal, wherein a surface of the component fabricated of metal constitutes the outer circumferential surface of the stator unit or the adhesion surface of the base;
    and cleaning the surface of the component fabricated of metal with plasma or ultraviolet radiation before the stator unit is inserted into the base.

* * * * *